Aug. 4, 1936.     D. J. EVANS     2,049,559
DOSING APPARATUS
Filed Sept. 17, 1935

Inventor:—
David J. Evans,
By Smith, Michael & Gardiner,
His Attorneys.

Patented Aug. 4, 1936

2,049,559

UNITED STATES PATENT OFFICE 2,049,559

DOSING APPARATUS

David Johnson Evans, Tonbridge, England

Application September 17, 1935, Serial No. 40,969
In Great Britain September 20, 1934

5 Claims. (Cl. 210—40)

This invention relates to the dosing of water or other liquids with solutions in the desired proportions, for example in the treatment with hypochlorite of swimming bath water or of drinking water from suspected sources.

The invention has for its object to provide an injector device whereby the solution is added in definite and regular proportion to the water or other liquid, and improved regulating means whereby the dosing or proportions may be adjusted and checked, this device preferably including a non-return valve for preventing the flooding of the apparatus in case of obstruction to the normal flow of water.

The invention is hereafter described with reference to the accompanying drawing, in which:—

Figure 1:
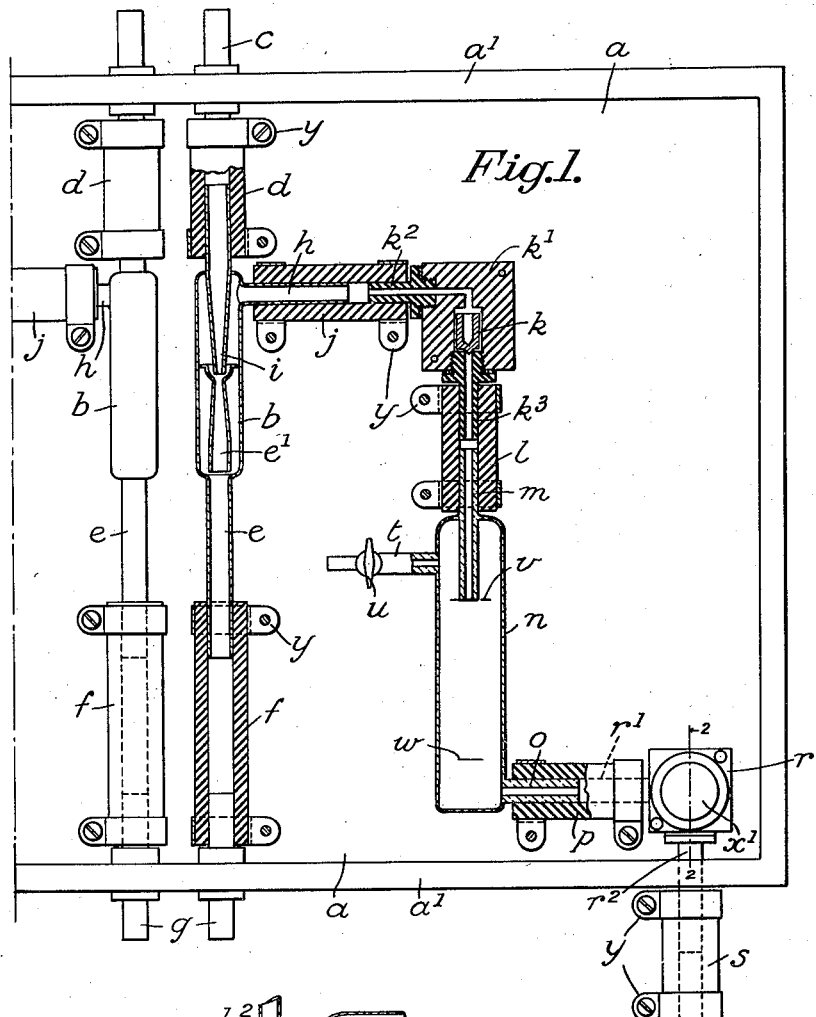
Fig. 1 is a part sectional elevation of a preferred construction comprising two sets of dosing and regulating devices mounted on the same panel.

Referring to Fig. 1, the apparatus comprises two similar sets of parts, mounted symmetrically right and left handed upon a panel $a$, whereby electrolytically produced hypochlorite or other solution can be admixed with two fractional supplies of water, led for example to two separate swimming baths, or two different solutions can be admixed with separate fractions of a single flow of water. The set of parts on the right hand side of the panel is shown complete, but the left hand set is represented only by the parts adjacent to the center of the panel the latter being broken off at the left of the figure. Each set of parts comprises a vertical injector chamber $b$, preferably made of glass, through which the water-fraction is passed, coming down from a nipple $c$ made of ebonite or like material, which is connected by a stout rubber sleeve $d$ to the top of the injector chamber; the outlet $e$ at the bottom of the latter leads through another rubber sleeve $f$ to an ebonite nipple $g$ leading to the bath. Near the top of the injector $b$ there is provided a horizontal branch $h$ which connects with the supply of solution as hereafter described; internally of the injector, this branch extends to around a vertical nozzle $i$ delivering the water centrally into the open end of a cone $e^1$ which forms a mixing chamber leading to the outlet $e$, the solution being drawn from the supply branch $h$ by suction induced by the flow of water through the injector.

Figures 2, 3:
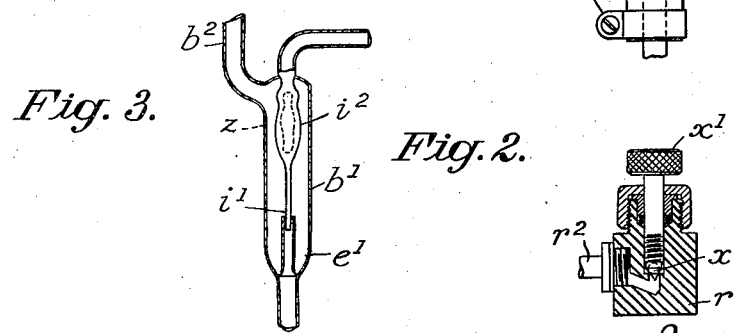
Fig. 2 is a detail in section on the line 2—2 of Fig. 1.
Fig. 3 is a section of an alternative construction of injector device, embodying a non-return valve.

The horizontal branch pipe $h$ is connected by a rubber sleeve $j$ with a casing $k^1$ inside which there is mounted a non-return valve $k$, the casing being provided with horizontal and vertical nipples $k^2$ $k^3$ respectively. The vertical nipple $k^3$ is connected by a rubber sleeve $l$ with a vertical delivery pipe $m$ at the top of a glass measuring vessel $n$, from the bottom of which there extends a horizontal supply pipe $o$ connected by a rubber sleeve $p$ with a nipple $r^1$ upon the casing $r$ of a regulating valve of any suitable type, for example a cone or needle valve $x$, as shown in Fig. 2, adjustable by means of a knob $x^1$; a second nipple $r^2$ upon the valve casing $r$ is connected by a rubber sleeve $s$ to a vertical pipe leading to the supply of solution, which may be electrolytically produced hypochlorite.

The glass measuring vessel $n$ is provided with a lateral branch pipe $t$ fitted at its outer end with an air valve $u$; the pipe $m$ at the top of this vessel extends down internally to a point below the opening of the branch pipe $t$, and at the level of the open lower end of the pipe the wall of the vessel is marked with a horizontal line $v$, another line $w$ being marked on the wall at a level representing a given volume, for example 50 cubic centimeters, between the two lines.

The panel $a$ is shown provided with an outer wall or framing $a^1$ through which the nipples $c$, $g$ and $r^2$ are fitted, the various parts of the apparatus being also attached to the panel $a$ by suitable clips or the like (not shown); the rubber sleeves $d$, $f$, $j$, $l$, $p$ and $s$ are clamped upon their pipes or nipples by suitable band clips $y$ of the kind employed for rubber hose pipes.

By adjusting the regulating valve $x$, the rate of flow of the solution through the vessel $n$ in proportion to the flow of water through the injector $b$ can be set to suit the desired conditions. The injector chamber $b$ will receive a constant fraction of the total flow of water, the nipple $c$ being connected to the bath supply pipe or the like by means of a T-piece or other fitting, so that the quantities are in constant proportion; the desired dosing or proportion between the rate of flow of the solution and the total flow of water can therefore be maintained by means of the regulating valve $x$.

In order to check the correctness of this dosing or proportion, the air valve $u$ is opened periodically to allow the column of solution in the glass measuring vessel $n$ to sink to the lower calibration mark $w$; the valve $u$ is then closed and the column allowed to rise again in the vessel as the air is drawn off by the injector. By timing the number of seconds required for the column to reach the upper calibration mark $v$ and ascertaining from the pumping figures or like data how many gallons of water have been delivered to the bath during the same time, it will be easy to see whether or not the measured quantity of solution (for example 50 c. c.) is approximately correct for that number of gallons of water, and to make any required correction by further opening or closing the regulating valve $x$ for the supply of solution.

The apparatus is preferably of such dimensions and arrangement that the air admitted to the measuring vessel $n$ does not reach the injector nozzle $i$ until after the expiration of the timed period; this air is then rapidly drawn off by the injector and the supply of solution continues without serious interruption.

If, at any time, the outlet $e$ from the injector chamber should become obstructed, the water rising up inside the injector nozzle will close the non-return valve $k$ and prevent a reverse flow of water into the measuring vessel $n$ and thence into the electrolytic apparatus by way of the regulating valve $x$. The cessation of flow can be signalled by any convenient means, operated for example by a float arranged in a bowl through which the water passes from the outlet nipple $g$ to the bath or the like.

The bore of the glass delivery tube $m$ at the top of the measuring vessel $n$ is of smaller diameter than the inlet from the supply pipe, so as to ensure a steady flow.

Fig. 3 represents an alternative construction of injector, in which the supply of water enters through a lateral branch $b^2$ extending upwards from near the top of the injector chamber $b^1$, the solution being led in at the top to a nozzle $i^1$ extending down into the open end of the mixing pipe or cone $e^1$ at the bottom of the chamber. The nozzle $i^1$ is formed with a bulbous enlargement $i^2$ containing a bead or float $z$ so shaped that when lifted by reversal of the flow it will seal the passage from the supply but when depressed by the descending current of solution it will allow the latter to reach the extremity of the nozzle $i^1$ and mix with the water flowing down through the injector chamber $b^1$ and producing the suction or injector effect.

The improved regulating device is mainly intended for controlling the dosing of bath water or drinking water with hypochlorite solution, but it may evidently be employed for adding one or more other solutions (such as alum or aluminium sulphate) to water for any purpose, with facility for checking and adjusting the proportions during the operation. When a single solution is to be mixed with one supply of water, the regulating apparatus need be provided with only a single set of parts, instead of the two sets illustrated in Fig. 1.

What I claim is:—

1. Regulating means for checking the proportions of a dosing solution added to a liquid comprising an injector through which the liquid to be dosed is passed at a substantially constant rate, means for supplying the dosing solution to said injector under suction produced by said liquid, and a measuring device for indicating the actual rate of flow of said solution to said injector, said measuring device consisting of a calibrated vessel provided with an inlet near the base, an outlet near the top and a valve for admitting air to said vessel to break the suction therein.

2. In combination with means for dosing a liquid with solution under suction produced by the passage of said liquid through an injector, a measuring device for checking the flow of solution, comprising a calibrated vessel having an inlet near the base of said vessel, solution being drawn up through said inlet by said suction, an outlet near the top of said vessel, a branch pipe entering said vessel above the level of said outlet, and a valve adapted to admit air through said branch pipe for breaking the suction, the level of solution then falling by gravity flow back through said inlet, and the closing of said valve restoring the suction to cause said solution to be drawn again into said vessel from said inlet.

3. Means for dosing a liquid with a solution supplied under suction produced by passage of said liquid through an injector, comprising in combination a calibrated measuring vessel formed with pipes for the supply and delivery of said solution and with a valve-fitted branch for the admission of air to the upper part of said vessel, said solution-supply pipe opening into said vessel below the opening of said solution-delivery pipe, and the calibration of said vessel defining a capacity between the opening of said solution-delivery pipe and the opening of said solution-supply pipe, a regulating valve controlling the normal flow of solution through said measuring vessel, an injector chamber formed with branch pipes for the continuous supply and delivery of said liquid and for the normal supply of said solution from said solution-delivery pipe to mix with said liquid in the injector inside said chamber, and means for opening said valve-fitted branch to interrupt at will the normal flow of solution through said measuring vessel.

4. Apparatus for dosing a liquid with solution under suction produced by passage of said liquid through an injector, comprising an injector having a nozzle through which said liquid is passed at a known rate, a measuring device through which said solution passes to said injector, and a valve for regulating the rate of flow of said solution, said measuring device consisting of a calibrated vessel, an inlet near the base of said vessel, an outlet near the top of said vessel, a branch pipe for admitting air to said vessel, and a valve controlling said branch pipe, said outlet being below the level of the mouth of said branch pipe, and said inlet drawing said solution from a supply below the level of said outlet so long as said branch pipe is closed by said controlling valve.

5. A method of dosing a liquid with a solution, which comprises passing said liquid through an injector, applying the suction of said injector to a measuring vessel for drawing up said solution from a supply at lower level to mix with said liquid in said injector, periodically admitting air to break the suction in said measuring vessel, thereby interrupting the flow of said solution and allowing it to return by gravity from said measuring vessel to said supply, re-applying the suction of said injector to said measuring vessel for restoring the normal flow of said solution towards said injector, and ascertaining the rate of flow of said solution by timing the rise of level in said measuring vessel.

DAVID JOHNSON EVANS.